United States Patent
Jäschke

(10) Patent No.: US 9,394,009 B2
(45) Date of Patent: Jul. 19, 2016

(54) CONNECTION ARRANGEMENT OF STRUCTURAL UNITS AND METHOD FOR CONNECTING STRUCTURAL UNITS

(71) Applicant: Audi AG, Ingolstadt (DE)

(72) Inventor: Anja Jäschke, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/390,625

(22) PCT Filed: Mar. 23, 2013

(86) PCT No.: PCT/EP2013/000881
§ 371 (c)(1),
(2) Date: Oct. 3, 2014

(87) PCT Pub. No.: WO2013/149706
PCT Pub. Date: Oct. 10, 2013

(65) Prior Publication Data
US 2015/0115640 A1  Apr. 30, 2015

(30) Foreign Application Priority Data
Apr. 4, 2012 (DE) .......... 10 2012 006 824

(51) Int. Cl.
*B62D 27/02* (2006.01)
*B62D 29/00* (2006.01)
(Continued)

(52) U.S. Cl.
CPC .............. *B62D 27/023* (2013.01); *B32B 37/12* (2013.01); *B32B 37/18* (2013.01);
(Continued)

(58) Field of Classification Search
CPC ... B62D 27/023; B62D 29/002; B60J 5/0452; B60J 5/0454

USPC ............................... 296/187.02, 29
See application file for complete search history.

(56) References Cited

U.S. PATENT DOCUMENTS

| 3,331,173 | A | 7/1967 | Elsner |
| 4,615,166 | A | 10/1986 | Head |

(Continued)

FOREIGN PATENT DOCUMENTS

| CN | 102199699 | 9/2011 |
| DE | 198 39 931 | 3/2000 |

(Continued)

OTHER PUBLICATIONS

Chinese Search Report issued on Oct. 28, 2015 with respect to counterpart Chinese patent application 201380017516.0.

(Continued)

*Primary Examiner* — Jason S Morrow
(74) *Attorney, Agent, or Firm* — Henry M. Feiereisen LLC

(57) ABSTRACT

In a method for connecting at least two structural units for a body of a vehicle, which structural units have in each case at least one carrier unit which is in the form of a hollow profile and which has at least one reinforcement element arranged in the carrier unit, the respective reinforcement element is connected by structural foam to the corresponding carrier unit, wherein the reinforcement elements of the two structural units are formed in each case with a joining portion and are joined to one another. The structural units to be connected are aligned, and the reinforcement elements are pre-fixed in the carrier units before a heat treatment of the structural units, and are finally fixed by foaming and/or adhesive bonding after the heat treatment.

13 Claims, 3 Drawing Sheets

(51) Int. Cl.
*B60J 5/04* (2006.01)
*B32B 37/12* (2006.01)
*B32B 37/18* (2006.01)
*B32B 38/00* (2006.01)

(52) U.S. Cl.
CPC .......... *B32B 38/0036* (2013.01); *B60J 5/0402* (2013.01); *B60J 5/0452* (2013.01); *B62D 29/002* (2013.01); *Y10T 156/10* (2015.01)

(56) References Cited

U.S. PATENT DOCUMENTS

| | | | |
|---|---|---|---|
| 6,247,287 B1 | 6/2001 | Takabatake | |
| 6,435,601 B2 * | 8/2002 | Takahara | B60R 21/04 280/748 |
| 6,478,367 B2 | 11/2002 | Ishikawa | |
| 6,519,854 B2 | 2/2003 | Blank | |
| 6,523,884 B2 | 2/2003 | Czaplicki et al. | |
| 6,550,847 B2 | 4/2003 | Honda et al. | |
| 2002/0033617 A1 * | 3/2002 | Blank | B62D 21/157 296/187.02 |
| 2004/0045250 A1 * | 3/2004 | Takeuchi | B62D 25/20 52/655.1 |
| 2008/0217960 A1 | 9/2008 | Kochert et al. | |
| 2010/0270846 A1 | 10/2010 | Gleyal et al. | |
| 2011/0206890 A1 * | 8/2011 | Belpaire | B62D 29/002 428/68 |
| 2013/0313859 A1 * | 11/2013 | Barz | B62D 25/025 296/193.06 |
| 2014/0084633 A1 * | 3/2014 | Matsuda | B62D 25/02 296/203.01 |
| 2014/0084635 A1 * | 3/2014 | Matsuda | B62D 25/02 296/205 |
| 2014/0301775 A1 * | 10/2014 | Ehrlich | B62D 27/02 403/267 |

FOREIGN PATENT DOCUMENTS

| | | |
|---|---|---|
| DE | 102009049313 A1 | 5/2011 |
| EP | 0 695 848 | 2/1996 |
| EP | 1759959 A2 | 3/2007 |

OTHER PUBLICATIONS

Translation of Chinese Search Report issued on Oct. 28, 2015 with respect to counterpart Chinese patent application 201380017516.0.

* cited by examiner

CONNECTION ARRANGEMENT OF STRUCTURAL UNITS AND METHOD FOR CONNECTING STRUCTURAL UNITS

CROSS-REFERENCES TO RELATED APPLICATIONS

This application is the U.S. National Stage of International Application No. PCT/EP2013/000881, filed Mar. 23, 2013, which designated the United States and has been published as International Publication No. WO 2013/149706 A1 and which claims the priority of German Patent Application, Serial No. 10 2012 006 824.7, filed Apr. 4, 2012, pursuant to 35 U.S.C. 119(a)-(d).

BACKGROUND OF THE INVENTION

The invention relates to a method for connecting structural units and a connection arrangement of two structural units for a vehicle body.

Many variations of generic methods for connecting two structural units for a vehicle body are known. Such methods are used at different sites in motor vehicles to increase stiffness and for reducing the weight of a vehicle body, in particular in a lightweight vehicle body. For producing the connection arrangement of two structural units, in particular lightweight materials of many different designs are used, which due to a high torsional stiffness and with this very high weight-specific energy absorption, are excellently suited for absorbing crash energy in motor vehicles. As additional stiffening element a filler and/or a foamable synthetic resin is introduced into the structural units, wherein the filler or the synthetic resin connects the structural units with the adjoining components.

From DE 12 1009 049 313 B4 for example a connection arrangement of two structural units for a vehicle body is known which each have a carrier unit which is configured as hollow profile with a reinforcement element arranged in the carrier unit. The reinforcement element is connected with the corresponding carrier unit with structural foam, wherein the reinforcement elements of the two structural units are each configured with a joining section and are joined with each other via the joining section. The components, which are connected with structural foam, are permanently fixed in their position.

The object of the invention is to provide a method for connecting structural units and a connection arrangement of two structural units for a vehicle body, which enable a tension-free stiffening of a carrier unit of the vehicle with simple and cost effective means.

According to the invention, the object is solved by providing a method for connecting structural units including providing at least two structural units for a vehicle body, each of the at least two structural units comprising at least one carrier unit configured as a hollow profile, and at least one reinforcement element arranged in the carrier unit, the at least one reinforcement element being connected with the at least one carrier unit with structural foam, orienting the at least two structural units, prefixing the reinforcement elements in the carrier units; heat treating the structural units; permanently fixing the reinforcement elements by applying the structural foam and/or an adhesive; joining the at least one reinforcement element of one of the at least two structural units with the at least one reinforcement element of the other one of the at least tow structural units via a joining section provided on the respective at least one reinforcement element. The object is further solved by a connection arrangement including two structural units for a body of a vehicle, each said two structural units comprising at least one carrier unit configured as hollow profile and at least one reinforcement element arranged in the carrier unit, wherein the at least one reinforcement element is connected with the carrier unit with structural foam, wherein the two structural units are interconnected by the steps of orienting the two structural units; prefixing the reinforcement elements in the carrier units; heat treating the structural units; permanently fixing the reinforcement elements by applying the structural foam and/or an adhesive, and joining the at least one reinforcement element of one of the at least two structural units with the at least one reinforcement element of the other one of the at least tow structural units via a joining section provided on the respective at least one reinforcement element. Advantageous embodiments and refinements of the invention are set forth in the dependent claims.

In order to provide a method for connecting structural units and a connection arrangement of two structural units for a vehicle body, which enables a tension free stiffening of a carrier unit of the vehicle with simple and cost effective means, it is proposed according to the invention that the structural units to be interconnected are oriented and the reinforcement elements are prefixed in the carrier units prior to a heat treatment of the structural units and after the heat treatment are permanently fixed by foaming and/or gluing. Advantageously the method according to the invention makes it possible that the structural units to be interconnected and the reinforcement elements are exactly oriented relative to each other in the carrier units after their mounting, and are fastened or permanently fixed in their oriented position after a heat treatment. This achieves that the carrier units are fastened or permanently fixed in an optimal and defined position relative to each other so as to be well able to absorb and distribute the forces to be transferred. This is necessary in order to ensure the function of the structural units and to prevent a buckling of the preferably skeleton-like carrier units or the reinforcement elements. The method according to the invention allows realizing an exact orienting and a fixing of the structural units and the reinforcement elements in the carrier units, because the movements of the components relative to each other can be accounted for after a heat treatment. The secure connection according to the invention of the structural components with the carrier structure of the vehicle body can improve the stiffness of the vehicle body in a targeted manner and also withstand compressive loads which do not ideally act perpendicularly on the structural components and may thus lead to torques and compressive forces. Thus ensures a very good absorption of crash energy in vehicles. A further advantage of the method is that the structural unit according to the invention can be configured very lightweight but still torsion stiff and can absorb a large portion of the crash energy acting on the vehicle because it can have a very high specific energy-absorption capacity. By improving the stiffness of the carrier structure of the vehicle according to the invention, the demands on the material and the strength of the carrier structure can be adjusted to the respective application.

In an advantageous embodiment of the method according to the invention the prefixing can be implemented as mechanical hooking and/or chemical connection. As a result the components to be connected can advantageously be pre-mounted and fixed in a defined position. Thus a chemical agent can for example be applied over a large surface area and/or constructive mechanical fastening means can be integrated in the components to be fixed to each other. In both cases a correspondingly configured vehicle body part can be prefixed or pre-mounted fast and cost-effectively. Advantageously, such a prefixing of the components enables small relative movements in closed profiles or between two components, which movements may necessarily result from the heat treatment. Using separate mechanical fastening elements or a lightweight chemical agent only generates very small material costs and manufacturing costs while maintaining the vehicle weight.

In a further advantageous embodiment of the method according to the invention internal tensions can be lowered in the structural units. The internal tensions in the components can lead to warping during the fixing and heat treatment which may lead to dimensional inaccuracies in the vehicle body. The warping may also require reworking during the final mounting such as mounting of further components, tolerance compensation etc., which causes high costs and long mounting times. As a result of the prefixing and subsequent heat treatment for decreasing internal stresses in the components, embodiments of the method according to the invention advantageously enable a mostly tension-free assembly of the components so that reworking can be avoided. The mounting means used in the pre-mounting can avoid generating internal stresses during the mounting. Because mechanical hookings and also the chemical connection in the form of adhesives only cause minor internal tensions, the internal tensions remaining in the metallic components due to small tolerances can be effectively decreased by the heat treatment. Tension-free mounted components can have a very long service life.

In a further advantageous embodiment of the method according to the invention, the carrier units and/or the reinforcement elements of the structural units can be made from different materials and/or different material combinations. This allows advantageously a simplification of the joining technique during composite construction, in particular of structural units made of different materials and/or different material combinations, which allows designing a lightweight component in accordance with a lightweight concept with different strength properties. This allows constructively adjusting the stiffness or the specific energy-absorption capacity of the structural units in a targeted manner to a crash scenario, and also allows positively influencing the crash behavior of the carrier structure or a section of the carrier structure of the motor vehicle. A further advantage of the method according to the invention is that the use of different materials and/or different material combinations is optimally suited for complicated structural units and junction geometries thereby making it possible to stiffen the carrier structure of the motor vehicle cost effectively.

In a further advantageous embodiment of the method according to the invention, the materials and/or the material combinations have different heat expansion coefficients. The strongly differing heat expansion coefficients can lead to mechanical tensions, which advantageously can be constructively taken into account and utilized in a positive manner. The thermal properties of a component positioned between two components can for example be used in a targeted manner for positioning of the component. The fact that the temperature-dependent length change of a component during heat treatment can be compensated by adjusting the starting length, means that for example components with strongly differing heat expansion coefficients such as aluminum and fiber reinforced plastics can be joined without problems. As an alternative it is possible to join components of a structural unit that have essentially identical heat expansion coefficients but in which the thermally induced length changes act essentially in different directions as a result of constructively compensating the length change of the components compensated in order to avoid generating mechanical tensions.

In a further advantageous embodiment of the method according to the invention, the materials and/or material combinations can be made of metals and/or non-metals such as carbon fiber reinforced plastics, fiber plastic composites or aluminum. This allows advantageously generating an extremely lightweight component with different strength properties, which can thus be designed fully in accordance with a lightweight concept, wherein the structural foam can serve as barrier between the structural components with different materials and/or different material combinations. As a result contact corrosion between the components of the structural unit can advantageously be effectively avoided and a structural unit can be produced which is optimized with regard to occurring loads.

Preferably the heat treatment can be implemented as curing process of a cathodic dip-coating. This also creates particularly good conditions after the subsequent drying for the adhesion of the introduced structural foam. In particular this method allows an economic treatment of the surfaces of a large number of the structural units in the mounted state and providing them with optimal corrosion protection. The cathodic dip-coating is optimally suited for such carrier structures of the motor vehicle because they can be varnished at a temperature of about 185 C in an automated and environment-friendly manner. A further advantage of the cathodic dip-coating is the even coating of metal surfaces and hollow spaces with even layer thicknesses and good surface qualities.

In a further advantageous embodiment of the method according to the invention, at least one reinforcement element of the structural unit can have at least one reinforcement rib. This allows configuring the structural unit advantageously torsion stiff and still particularly lightweight which allows distributing and transferring compressive forces over a large surface onto adjoining component surfaces. The stiffening rib can be configured uneven or even and as a result absorb increased compressive loads particularly well. A further advantage of the invention is that the variable configuration of the geometry of the stiffening rib, in particular by a targeted and/or uneven material thickness of the stiffening rib, allows adjusting the load-bearing capacity of the structural unit and the entire energy absorption capacity. A further advantage is the large surface of the structural unit, which has the stiffening rib, which allows achieving a high torsional stiffness of the foamed structural unit after introducing the structural foam.

In a further advantageous embodiment of the method according to the invention, the reinforcement elements can be connected with the corresponding carrier unit via the structural foam and/or the adhesive in a form fitting and/or force fitting and/or materially bonding connection. As a result no elaborate mounting steps or cost-intensive joining methods are required for connecting the reinforcement elements with the corresponding carrier unit so that additional costs and mounting costs can be reduced. Thus multiple complicated components of the structural units can be connected and stiffened fast and simple and cost-effectively in hard to access regions or junctions. The purpose of the structural foam and/or the adhesive is to preferably position a reinforcement element or a structural unit in a carrier unit or to fix it in its position in order to stiffen the carrier unit. Such large-area foamed structural units or carrier structures of a motor vehicle can have a particularly high torsion stiffness with low stiffness steps and can be configured with high load-bearing capacity. The structural foam or the adhesive can have a high elastic shear modulus while having a low specific weight. In addition the structural foam can prevent an electrochemical reaction between the materials of the interconnected components, which can lead to corrosion. As a result the stiffness and the quality of the vehicle body can be effectively improved.

Further a connection arrangement of two structures for a vehicle body of a vehicle is proposed which each include at least one carrier unit which is configured as hollow profile with at least one reinforcement element arranged in the carrier unit, where the respective reinforcement element is connected with the corresponding carrier unit with construction foam, and wherein the reinforcement elements of the two structural units are each configured with a joining section and are joined to each other. The at least two structural units to be connected to each other are oriented and the reinforcement elements in the carrier units are prefixed prior to a heat treatment and after the heat treatment are permanently fixed by foaming and/or adhesive connection. This results in a cost-effective production of the components and a torsion stiff and lightweight structural unit, which advantageously can be used in different regions of the vehicle body because it can be connected with further structural units and can be produced in different sizes.

In an advantageous embodiment of the connection arrangement according to the invention, the carrier unit can be configured as partially closed hollow profile. This enables achieving a further improvement of the stiffness and the load-bearing capacity of the carrier unit according to the invention without addition of additional material. Preferably the carrier unit can beside the low weight and the high stiffness have the advantage of an improved specific energy absorption capacity. Due to the configuration according to the invention of the carrier unit the impact energy acting on the carrier unit can be absorbed in a controlled manner and in particular the energy absorption capacity of the carrier unit according to the invention can be significantly improved in a simple and cost-effective manner.

In a further advantageous embodiment of the connection arrangement according to the invention, the prefixing can be implemented by using an adhesive with high expansion on rubber basis, which is capable of withstanding the different longitudinal expansions of the materials without damage. Because it is possible to use only small amounts of the adhesive for the prefixing of the components the manufacturing method can be significantly simplified. Beside a secure connection and a precise mounting of the structural unit the mounting costs can be significantly lowered. Because for the prefixing of the structural unit and the adjoining components the adhesive is only applied over individual points or over a short distance with a small surface, a sufficiently large gap remains between the structural unit and the adjoining components so that a surface treatment or varnishing or foaming in the hollow spaces can occur in a targeted manner, which allows permanently fixing the structural unit in its position particularly easily after the heat treatment.

In a further advantageous embodiment of the connection arrangement according to the invention, a PUR-structural foam can be used as structural foam. This advantageously ensures a stable and durable connection between the structural unit and the carrier structure of the vehicle body, wherein the structural foam is not visually perceptible. In addition the structural foam can prevent ingress of humidity and effectively dampen the relative movements between the structural unit and the carrier structure of the vehicle body.

BRIEF DESCRIPTION OF THE DRAWING

Advantageous embodiments of the invention are shown in the drawing and are described in the following. Corresponding components are designated in the figures with the same reference numerals. Only one of two same components is shown in each Figure.

It is shown in.

DETAILED DESCRIPTION OF PREFERRED EMBODIMENTS

Figure 1:
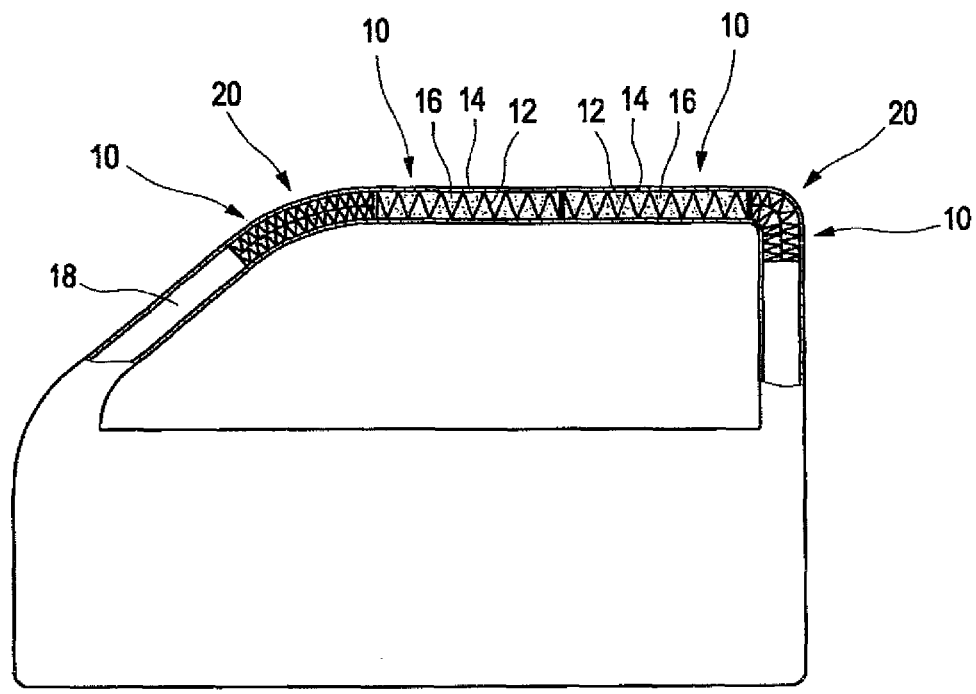
FIG. 1 a partial sectional representation of a hollow profile of a door wing of a vehicle with an exemplary embodiment of a connection arrangement according to the invention of multiple structural units, which are interconnected with structural foam, FIG. 2 a detailed sectional representation of the parts relevant for the invention of FIG. 1, FIG. 3 a perspective representation of a further exemplary embodiment of a connection arrangement according to the invention with a structural unit composed of a carrier unit, a reinforcement element and structural foam, FIG. 4 a perspective representation of the connection arrangement according to the invention of FIG. 3 without reinforcement element, FIG. 5 a perspective representation of a first exemplary embodiment of the reinforcement element for the connection arrangement according to the invention of FIG. 3, FIG. 6 a sectional representation of the reinforcement element for the connection arrangement according to the invention of FIG. 5, and FIG. 7 a sectional representation of a second exemplary embodiment of a reinforcement element for the connection arrangement according to the invention.

As can be seen from FIG. 1, the shown exemplary embodiment of a connection arrangement according to the invention includes at least two structural units 10 for a vehicle body of a vehicle. The at least two structural units 10 include each at least one carrier unit 12 which is configured as hollow profile and at least one reinforcement element 14, 14' which is arranged in the carrier unit 12. The respective reinforcement element 14, 14' is connected with the corresponding carrier unit 12 with structural foam 16, wherein the reinforcement elements 14, 14' of the two structural units 10 are each formed with a joining section and are joined with each other.

In order to provide a connection arrangement according to the invention of two structural units 10 for a vehicle body which easily and cost-effectively enables a tension-free stiffening of a carrier unit 12 of the motor vehicle, it is proposed according to the invention that the structural units 10 to be interconnected are oriented and the reinforcement elements 14, 14' are prefixed in the carrier units 12 prior to a heat treatment of the structural units 10 and after the heat treatment are permanently fixed by foaming and/or gluing.

Figure 2:
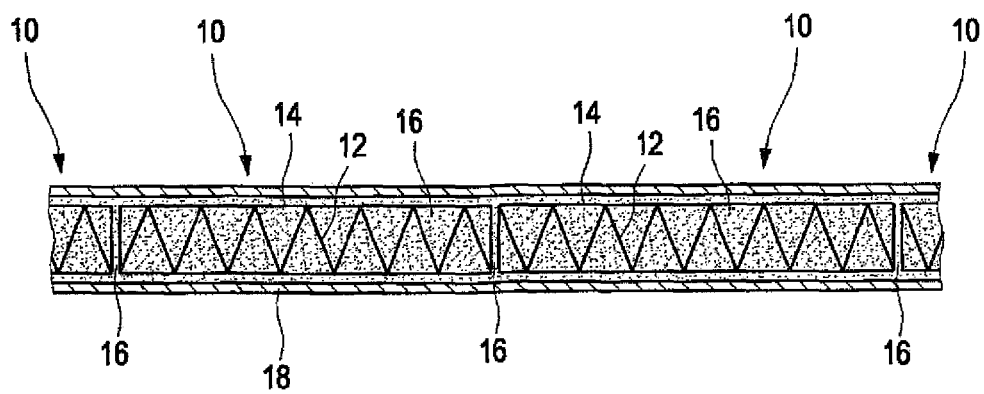

As can be further seen from FIGS. 1 and 2 in the present exemplary embodiment four structural units 10 according to the invention are mounted in a door holm 18 of a vehicle door. In the straight section of the door holm 18, which is configured as hollow profile, two identical structural units 10 are arranged, which are each surrounded by a structural unit 10, which is arranged in a corner region 20 or junction. The geometry and the configuration of the structural units 10 can be adjusted to the mounting geometry with a defined stiffness, which also enables configuring the carrier unit 12 and the reinforcement elements 14, 14' arranged in the carrier unit 12 differently. Between the structural units 10 the free interspaces of the door holm 18, which is configured as hollow profile, can be foamed partially or completely with structural foam 16 which allows interconnecting the structural units 10 to each other and to the inner surfaces of the hollows profile of the door holm 18 and thus an additional mechanical stiffening of the door holm 18 can be achieved.

In a further here not shown exemplary embodiment, a structural unit or multiple structural units can be permanently interconnected by foaming and/or gluing and can be connected between components of a carrier structure of the motor vehicle, preferably via at least one stiffening rib of the reinforcement element with the carrier structure of the motor vehicle.

Figure 3:
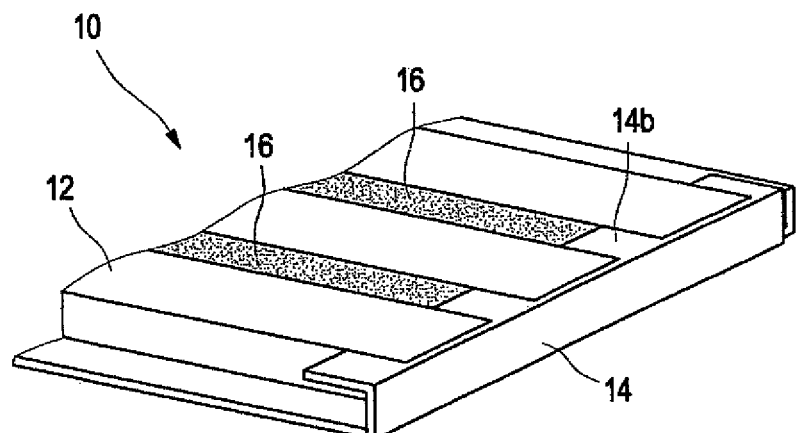

As can be seen from FIG. 3 the carrier unit 12 in the shown exemplary embodiment is at least partially configured as closed hollow profile, wherein the carrier units 12 are configured as a rectangular profile, which has a hollow space. Of course other useful configuration of the profile of the carrier units 12 are conceivable by a person with skill in the art.

As can further be seen from FIGS. 3 to 7, the shown reinforcement elements 14, 14' are preferably configured U-shaped and have opposing stiffening ribs 14a, 14b which are arranged offset to each other, which allows producing a torsion stiff body with a high strength. The stiffening ribs 14a, 14b increase the joining surface of the reinforcement element 14, 14' to the carrier unit 12. The reinforcement element 14, 14' is fastened to at least one end side of the carrier unit 12, in that the stiffening ribs 14a, 14b of the reinforcement element 14, 14' embrace an end side of the carrier unit 12 and thereby close the open profile regions of the carrier unit 12. After the permanent joining of the reinforcement element 14, 14' on the carrier unit 12 by foaming and/or gluing, a torsion stiff component is generated.

Figure 4:
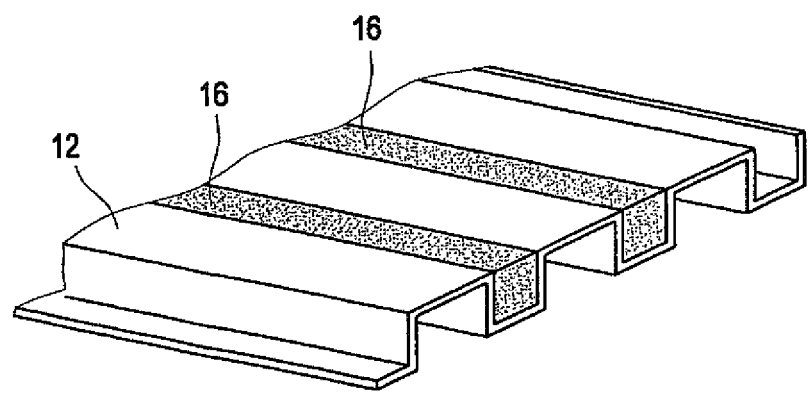
Figure 5:
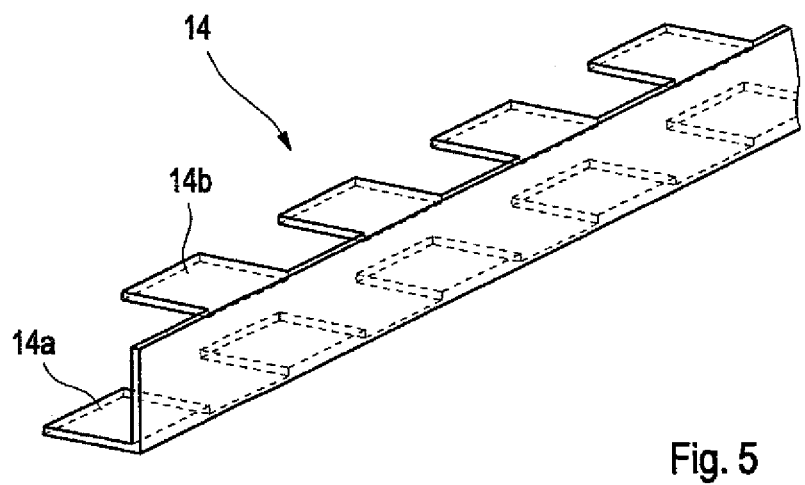
Figure 6:
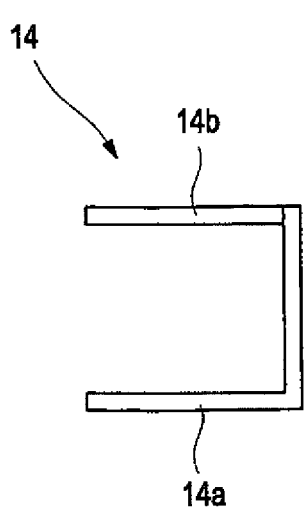

As can be further seen from FIGS. 3 and 4 the open hollow spaces of the profile of the carrier units 12 can be partially or completely filled with structural foam 16 as additional mechanical stiffening of the structural unit 10. In order to optimize the connection of the carrier unit 12 with the structural foam 16 and the weight of the carrier unit 12, the entire carrier unit 12 or only portions thereof can have perforations and/or a surface area increasing structure.

Figure 7:
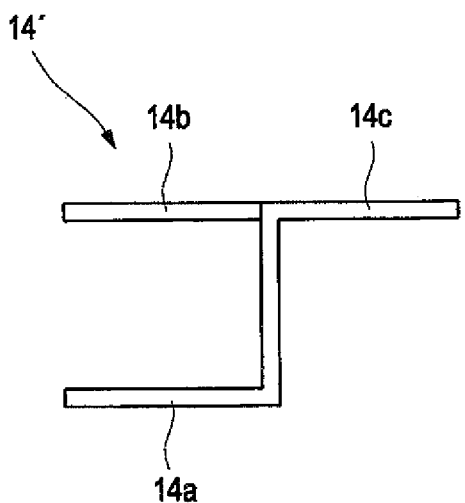

As can be further seen from FIG. 7, an alternative embodiment of the reinforcement element 14, 14' has an additional stiffening 14c, via which a connection of the structural unit 10 to the carrier structure of the motor vehicle can occur.

The structural units 10 are produced according to a method according to the invention. The at least two structural units 10 to be interconnected for a vehicle body include each at least one carrier unit 12 which is configured as hollow profile with at least one reinforcement element 14, 14' arranged in the carrier unit 12, wherein the respective reinforcement element 14, 14' is connected with structural foam 16 with the corresponding carrier unit 12, and wherein the reinforcement elements 14, 14' of the two structural units 10 are each formed with a joining section and are joined with each other. According to the invention the structural unit 10 to be interconnected are oriented and the reinforcement elements 14, 14' in the carrier units 12 are prefixed prior to a heat treatment of the structural units 10 and after the heat treatment are permanently fixed by foaming and/or gluing.

In order for the structural unit 10 to be able to be fixed in the desired position, a prefixing occurs in a first step prior to the heat treatment by an adhesive with high expansion on rubber basis, which withstands the different longitudinal expansions of the materials without damage. As an alternative the structural unit 10 can be prefixed in the desired position by mechanical fastening means which can be provided in the structural unit 10 and the corresponding fastening partner, whereby a mechanical fixing or latching can occur. After the heat treatment the structural unit 10, which is prefixed or mechanically latched in its position and the component receiving the structural unit 10 are completely filled with foamed.

Advantageously the prefixing is implemented as a mechanical hooking or a chemical connection, which permits a movement of the reinforcement elements 14, 14' and the carrier unit 12 during the heat treatment without the connection becoming lose. In the present exemplary embodiment at least one reinforcement element 14, 14" of the structural unit 10 has at least one stiffening rib 14a, 14b, 14c, where the reinforcement elements 14, 14' are preferably connected with the corresponding carrier unit 12 via 16 and/or glue by form fitting and/or force fitting and/or materially bonding connection. As structural foam 16 preferably a PUR-structural foam is used. Of course epoxy foam and/or metal foam such as for example aluminum foam etc. can also be used as structural foam. As an alternative to structural foam 16 also an adhesive on rubber basis can be used.

Due to the process beneficial elastic properties of the connection internal stresses in the structural units 10 due to the heat treatment are decreased even though the carrier unit 12 and/or the reinforcement elements 14, 14' of the structural units 10 are produced from different materials and/or different material combinations and thus have different heat expansion coefficients.

Preferably the materials and/or material combinations are made of metals and/or non metals which allows producing load specific structural units 10 with different strength properties which significantly can improve the stiffness of the carrier structure of the motor vehicle. In the heat treatment is for example a method which is configured as curing process in a cathodic dip-coating.

The invention claimed is:

1. A method, comprising:
providing at least two structural units for a vehicle body, each said at least two structural units comprising at least one carrier unit configured as a hollow profile, and at least one reinforcement element arranged in the carrier unit, said at least one reinforcement element being connected with the at least one carrier unit with structural foam;
orienting the at least two structural units;
prefixing the reinforcement elements in the carrier units;
heat treating the structural units;
permanently fixing the reinforcement elements by applying the structural foam and/or an adhesive;
joining the at least one reinforcement element of one of the at least two structural units with the at least one reinforcement element of the other one of the at least two structural units via a joining section provided on the respective at least one reinforcement element.

2. The method of claim 1, wherein the prefixing is implemented as a mechanical hooking and/or chemical connection.

3. The method of claim 1, wherein the heat treatment causes a reduction of internal tensions in the structural units.

4. The method of claim 1, wherein the carrier unit and/or the reinforcement elements of the structural units are made of different materials and/or material combinations.

5. The method of to claim 4, wherein the materials and/or the material combinations have different heat expansion coefficients.

6. The method of to claim 4, wherein the materials and/or material combinations are made of metals and/or non-metals.

7. The method of to claim 1, wherein the heat treatment is performed as a curing process of a cathodic dip-coating.

8. The method of to claim 1, wherein at least one reinforcement element of the at least two structural units structural units has at least one stiffening rib.

9. The method of to claim 1, wherein the reinforcement elements are connected with the corresponding carrier unit via the structural foam and/or the adhesive by a form fitting and/or force fitting and/or materially bonding connection.

10. A connection arrangement comprising:
two structural units for a body of a vehicle, each said two structural units comprising at least one carrier unit configured as hollow profile and at least one reinforcement element arranged in the carrier unit, wherein the at least one reinforcement element is connected with the carrier unit with structural foam, wherein the two structural units are interconnected by the following steps
orienting the two structural units;
prefixing the reinforcement elements in the carrier units;
heat treating the structural units;
permanently fixing the reinforcement elements by applying the structural foam and/or an adhesive, and
joining the at least one reinforcement element of one of the at least two structural units with the at least one reinforcement element of the other one of the at least two structural units via a joining section provided on the respective at least one reinforcement element.

11. The connection arrangement of claim 10, wherein the carrier unit is configured at least in part as a closed hollow profile.

12. The connection arrangement of claim 10, wherein the carrier unit and/or the reinforcement elements of the structural units are made of different materials and/or material combinations, and wherein the prefixing is implemented by using an adhesive on rubber basis which has a high expansion capacity, and which withstands different longitudinal expansions of the different materials without suffering damage.

13. The connection arrangement of claim 10, wherein the structural foam includes at least one member selected from the group consisting of a PUR-structural foam, an epoxy foam and a metal foam.

* * * * *